Dec. 25, 1962 C. LITTLEFIELD ETAL 3,069,826
MACHINE FOR PACKAGING WITH LIMP SYNTHETIC FILM WRAPPERS
Filed March 2, 1961 8 Sheets-Sheet 2

INVENTORS
Carl Littlefield
John W. Smith
BY
Otto A. Earl
ATTORNEY

Dec. 25, 1962 C. LITTLEFIELD ETAL 3,069,826
MACHINE FOR PACKAGING WITH LIMP SYNTHETIC FILM WRAPPERS
Filed March 2, 1961 8 Sheets-Sheet 3

INVENTORS
Carl Littlefield
John W. Smith
BY
Otis A. Earl
ATTORNEY

United States Patent Office 3,069,826
Patented Dec. 25, 1962

3,069,826
MACHINE FOR PACKAGING WITH LIMP
SYNTHETIC FILM WRAPPERS
Carl Littlefield, Bluffton, Ind., and John W. Smith, Battle Creek, Mich., assignors to Battle Creek Packaging Machines, Incorporated, Battle Creek, Mich.
Filed Mar. 2, 1961, Ser. No. 92,816
30 Claims. (Cl. 53—230)

This invention relates to improvements in a machine for packaging with limp synthetic film wrappers. The principal objects of this invention are:

First, to provide a semi-automatic machine for wrapping packages in sheets of limp synthetic material such as films of polyolefin.

Second, to provide a machine of this type which will receive a group of several smaller packages and automatically wrap the group in a single package and seal the polyolefin wrapper therearound.

Third, to provide a packaging machine which will advance sheets of limp packaging material for proper engagement with the package presented thereto and maintain control of the limp wrapper sheet until it is wrapped and sealed around the package.

Fourth, to provide seal apparatus for finally heat fusing the end folds in a wrapper of synthetic polyolefin material without burning or disintegrating the wrapping material.

Fifth, to provide novel sheet feeding means which can be adjusted to feed different sized sheets of limp wrapping film and advance the sheets to variably adjusted positions for engagement with different sized packages.

Sixth, to provide means for transferring a limp wrapping sheet from horizontal delivery position to a vertically disposed position for advance of a package to be wrapped through the vertical position of the sheet to wrap the sheet around three sides of the package.

Seventh, to provide a carriage for receiving a package with a film wrapped around three sides thereof and means for reciprocating the carriage to a discharge position while wrapping the sheet over the 4th side of the package.

Eighth, to provide means for completing third end folds on a partially wrapped package and ejecting the package for final folding and sealing.

Other objects and advantages of the invention will be apparent from a consideration of the following description and claims. The drawings, of which there are eight sheets, illustrate a highly practical form of the wrapping machine.

FIG. 8 is a fragmentary enlarged cross sectional view through two other ratchet drives in the wrapper sheet advancing mechanism appearing in FIGS. 2 and 6.

The machine of the invention is designed primarily for overwrapping groups of separate smaller packages which may or may not be retained in an open topped tray. Individual packages of breakfast cereals are a type of product adapted to be wrapped in the machine and the machine is designed to utilize limp webs of wrapping material such as polyolefins supplied in rolls. Other articles and packages can be wrapped on the machine. It is a feature of the machine that it will effectively maintain control of the limp polyolefin material until the final package is completely wrapped and the wrapper sheet heat fused and sealed into a protective and retaining wrapper. The terms limp and polyolefin are used to describe those synthetic films which have little or no stiffness so that they tend to crumple easily, cannot be pushed into position, and will not hold a crease or fold until sealed.

Figures 1, 13:
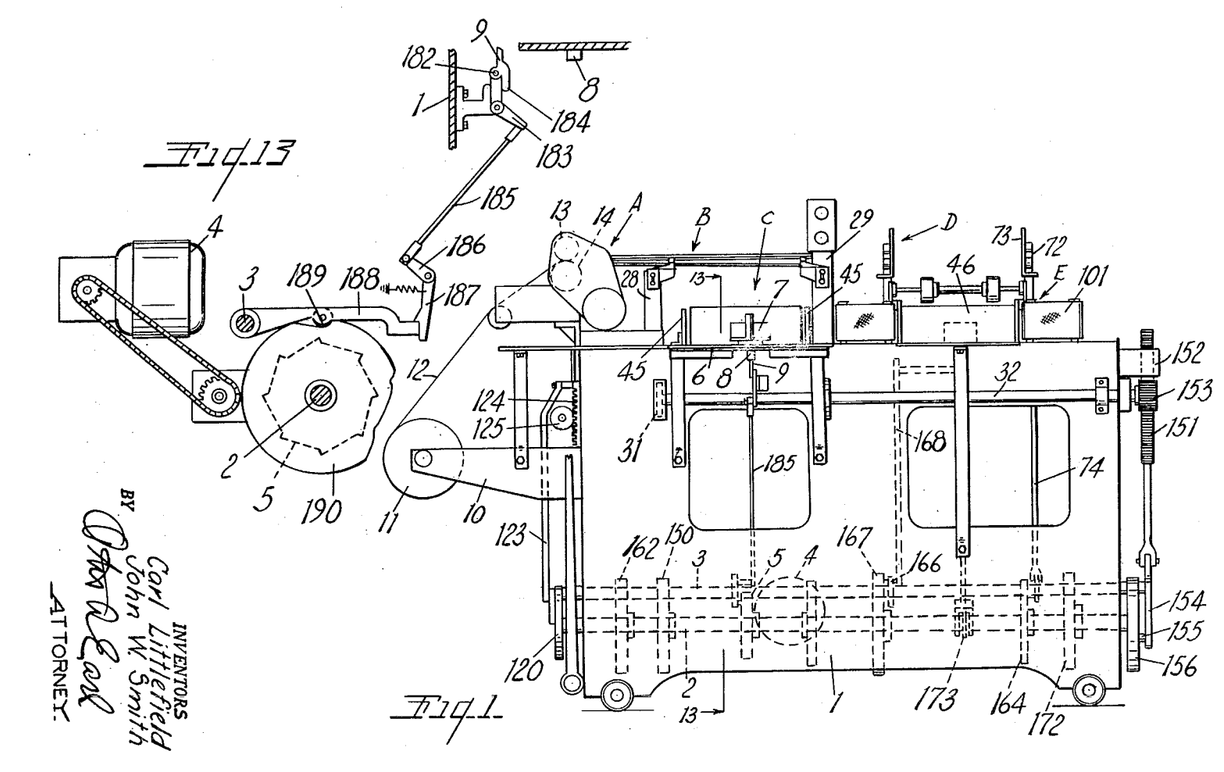
FIG. 1 is a front elevational view in general outline of a machine embodying the invention.
FIG. 13 is a fragmentary end elevational view of the clutch engaging mechanism which starts the wrapping cycle.
Figure 2:
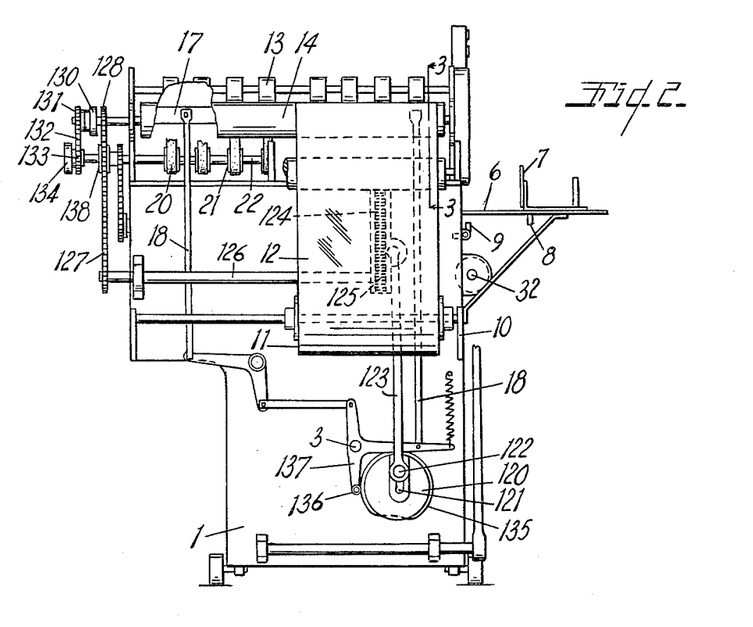
FIG. 2 is a left end elevational view in general outline of the machine as viewed in FIG. 1.
Figure 3:
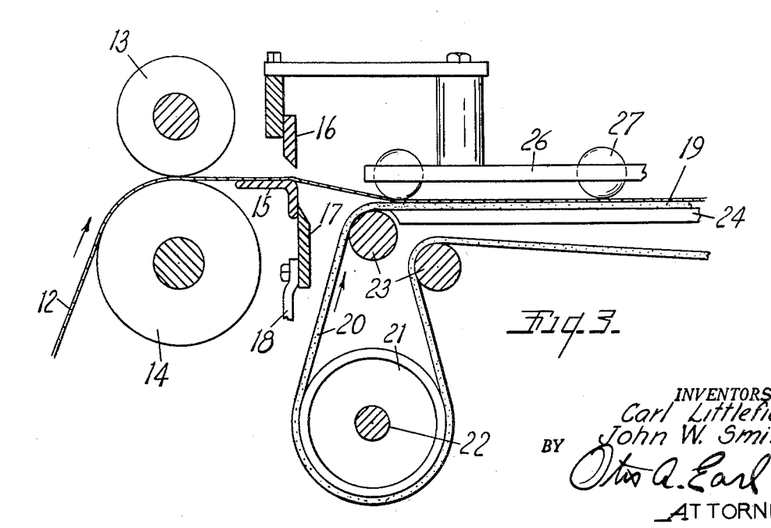
FIG. 3 is an enlarged fragmentary cross sectional view taken along the plane of the line 3—3 in FIG. 2 and illustrating the wrapper film feeding and cutting mechanism.

The machine includes several coacting sections which may be described generally as the wrapper web feeding and sheet severing section A, the initial sheet positioning mechanism B at the infeeding station of the machine, a package transfer carriage and driving mechanism C, end fold wrapping and package ejecting mechanism D, and final sealing mechanism E together with common cylically operated driving connections to the several sections of the machine so that the sections operate in the proper sequence. The machine includes suitable base or body panels 1 for supporting the driving mechanism and the several sections of the machine. The base carries a transversely extending cam shaft 2 with several cams thereon to be described, and a rock shaft 3 upon which several driving levers are pivotally supported. A motor 4 is mounted in the base 1 and connectable through a one revolution clutch 5 to the cam shaft 2 to initiate and drive the machine through the cycle of the wrapping operation. The articles to be wrapped are presented on an infeeding platform 6 and are advanced manually into the machine by a pusher 7 with the pusher acting through a depending pawl 8 to engage and trip the latch 9 which engages the one revolution clutch 5 when the new package to be wrapped is received in the machine. The clutch engaging linkage is illustrated in FIG. 13 and will be described in greater detail presently.

Considering first the wrapper web feeding and sheet severing and positioning mechanism A and B and the driving connections thereto, attention is directed to FIGS. 1 to 8 which show a support 10 for a supply roll 11 of the wrapper film. The film 12 is advanced over suitable guide rolls to the feed rolls 13 and 14. The roll 14 is driven by mechanism to be described while the pressure rolls 13 idle on the roll 14. The web is driven or directed over a narrow table 15 (see FIG. 3) below a fixed knife blade 16. A reciprocating knife 17 is driven by the push rods 18 to sever an individual wrapper sheet from the infeeding web. The leading end of the web 12 and the wrapper sheet cut therefrom are directed from the table 15 to the upper runs or reaches 19 of a plurality of transversely spaced feed belts 20. The feed belts are driven by pulleys 21 on the feed belt shaft 22 and are trained over suitable guide rolls 23 to spaced support rails 24. At their rear or right ends as viewed in FIG. 4 the belts are trained over an idler shaft 25. The belts 20 thus span above the carriage at the infeeding station C of the machine.

Figure 4:
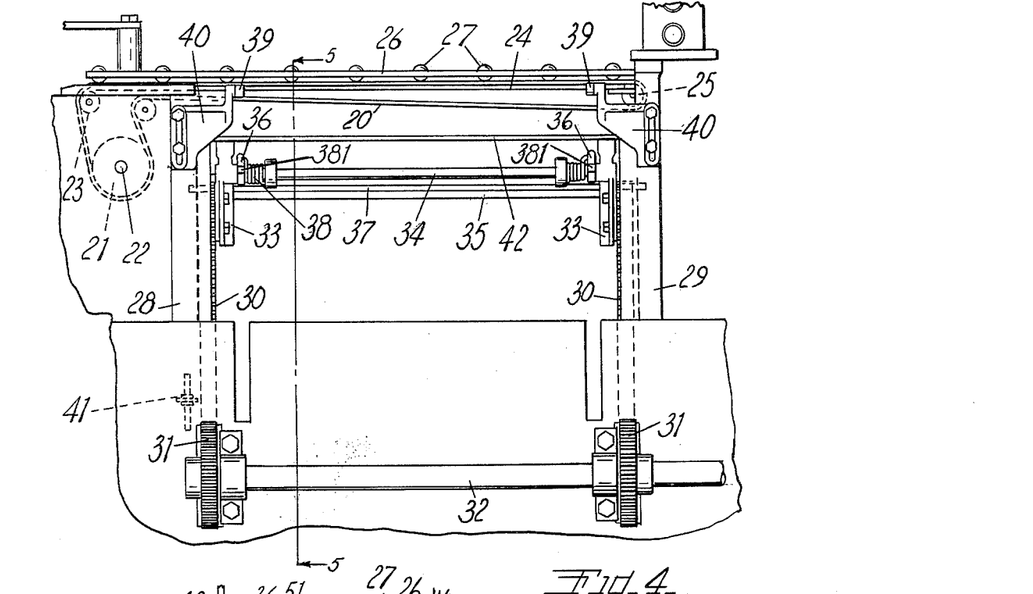
FIG. 4 is an enlarged fragmentary front elevational view of the package receiving or infeeding station of the machine omitting the package feed to better illustrate the wrapper feed.

Supported in spaced relationship above the supporting rails 24 and the upper reaches 19 of the belts are perforated guide bars 26 having weighted balls 27 guidingly retained therein in rolling contact with the infeeding web 12 to assure that the limp film will be held in driving contact with the belts and will be advanced in flat uncrumpled condition by the belts. Driving connections for the feed roll 14 and the belt drive shaft 22 which permit accurate location of the wrapper sheet by the belts will be described presently. For the moment it may be assumed that each successive individual wrapper sheet is advanced by the feed belts 19 to the proper position with its lateral edge exposed at the front of the machine at position B.

The article to be wrapped such as a group of small packages is presented to the machine by placing it on the infeeding platform 6 which is in front of and below the horizontal position of the wrapper sheet supported on the rails 24. Positioned at the sides of the infeeding station C are a left upright 28 and a right upright 29 which form guide ways for vertically reciprocable rack bars 30. (See FIGS. 4, 5 and 6.) The rack bars 30 are reciprocated vertically and simultaneously by rotation of gears 31 carried by the shaft 32 on the front of the machine. The shaft 32 is oscillated by mechanism which will be described presently. It is here sufficient to note that the upper ends of the rack bars 30 carry brackets 33 with a cross rod 34 extending therebetween and with a lower gripper bar 35 extending between the rack bars below and behind the cross rod 34. Pivotally mounted on the cross rod are a pair of gripper arms 36 having a movable gripper shoe 37 extending therebetween in opposed relationship to the fixed gripper bar 35. The gripper arms 36 are spring biased by spring 38 to move the gripper elements 35 and 37 into gripping relationship and the forward ends 381 of the gripper arms form actuating tappets which are engaged by stops or lugs 39 when the rack bars 30 and the gripper elements are moved to elevated position opposite the free front edge of the wrapper sheet retained on the feed belts 20. The lugs 39 are carried on brackets 40 adjustably secured to the uprights 28 and 29. At the lower limit of the travel of the rack bars 30 and the gripper elements 35 and 37 an adjustable screw abutment 41 engages the end of the movable gripper bar 37 to open the jaws when they are below the level of the infeed table 6. In this position of the rack bars and the grippers a movable table section 42 carried across the upper ends of the brackets 33 forms a flush continuation of the in-feed table 6.

The net effect of the operation of the rack bars 30 and the grippers 35—37 is to raise the grippers to receive the forward edge of the newly severed wrapper sheet indicated by the letter W as it is held on the upper reaches 19 of the feed belts by the weighted balls 27 and pull the wrapper sheet transversely from the belts and downwardly to vertical position directly behind the infeeding platform 6 where rearward motion of the pusher 7 will push the package through the vertical sheet folding the sheet around the back and partially over the bottom and top of the package.

Figure 14:
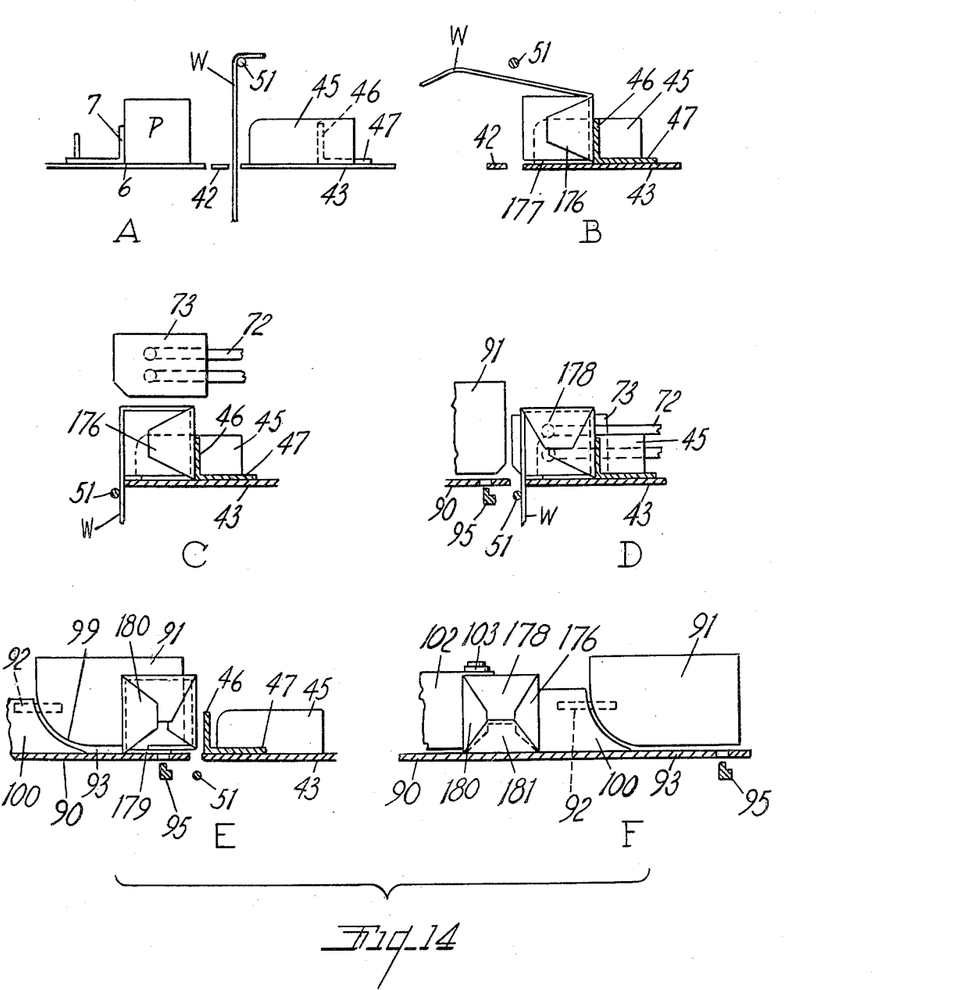
FIG. 14, sections A to F, is a schematic representation of the several steps in the cycle of the machine.

The package advanced against and into the vertical wrapper sheet from the infeeding table 6 is received upon a transfer carriage consisting of a flat plate 43 mounted upon a slide base 44. The carriage plate 43 is provided with laterally adjustable end plates 45 which are spaced to closely receive the ends of the package delivered therebetween. It is evident that if the wrapper sheet wrapped around the back of the package is longer than the package the projecting ends will be folded into rear tuck folds across the ends of the package by being pressed between the end plates 45. (See FIG. 14B.) Reciprocably mounted on the carriage plate 43 between the end plates 45 is a back plate 46 mounted on a slide bracket 47 and this back plate limits the rearward or inward motion of the package between the end plates. Later in the cycle, the back plate 46 ejects the package from the carriage.

Secured at the forward corners of the carriage plate 43 as by the brackets 48 are a pair of upright guide plates 49 having vertical slots 50 therein which guide a vertically reciprocable front folding cross bar 51. The ends of the front folding bar 51 are connected to links 52 depending below the carriage plate and the links are in turn pivotally connected to the angled lever arms 53. (See FIGS. 6 and 11.) The lever arms 53 are pivoted at 54 to brackets 55 on the underside of the rear edge of the carriage plate. A crank 56 connected to the levers 53 is provided with a slotted rear end 57 engageable with an actuating element to be described to raise and lower the front folding bar 51. The action and function of the front folding bar 51 is to raise to an elevated position just below the infeeding wrapper W (see FIGS. 5 and 14A) and behind the gripper elements 35—37 as appears in FIG. 5 so that the wrapper sheet is drawn downwardly in front of the front folding bar. Then when the package is pressed rearwardly onto the carriage plate and the wrapper sheet is folded over the top of the package, the front folding bar remains above the partially folded wrapper and upon drawing the front folding bar downwardly the wrapper sheet will be folded across the front of the package. (See FIG. 14C.) A yieldable gripping surface 58 may be provided just below the front edge of the carriage plate to coact with the front folding bar in holding the front fold of the wrapper sheet in position.

Figure 5:
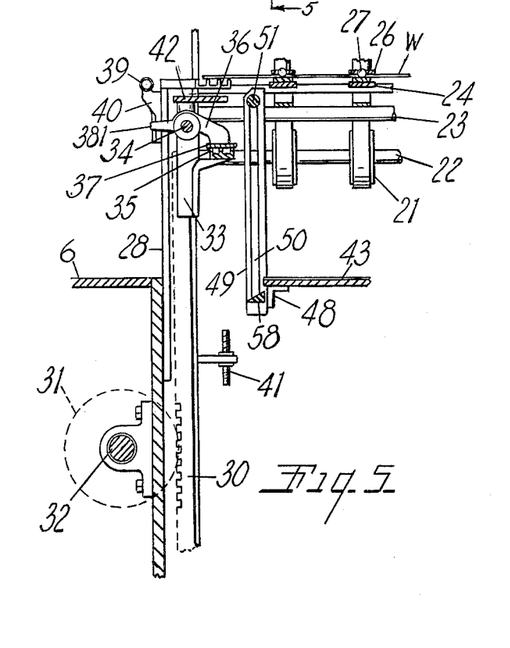
FIG. 5 is a fragmentary transverse cross sectional view taken along the plane of the line 5—5 in FIG. 4 showing the wrapper sheet feed and folding mechanism in one position.
Figures 5, 6, 7:
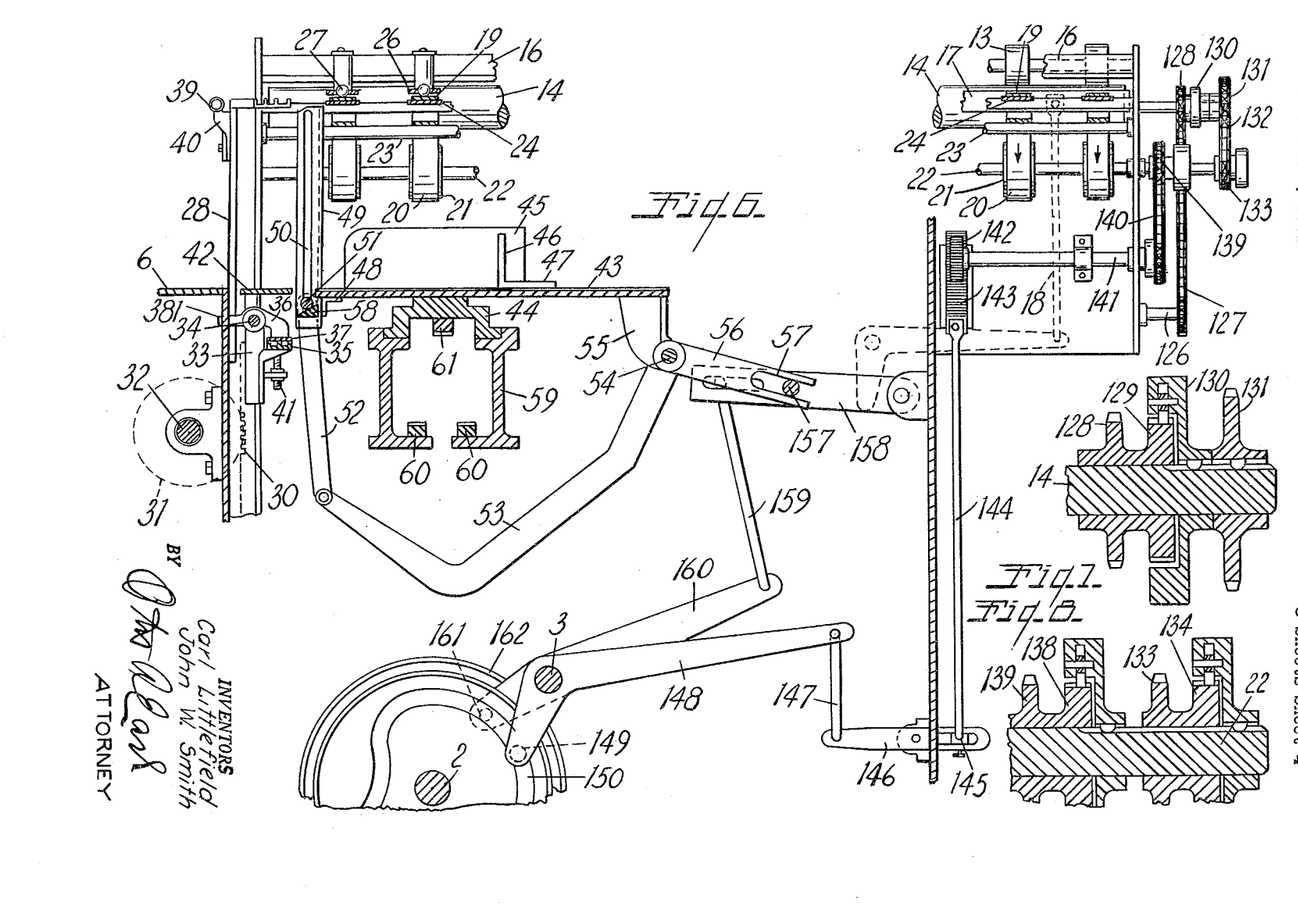
FIG. 6 is a fragmentary cross sectional view similar to FIG. 5 but showing the wrapper sheet feeding mechanism in an advanced position and showing the driving connections to the web feeding and cutting mechanism.
FIG. 7 is an enlarged fragmentary cross sectional view through the first ratchet drive of the web feeding mechanism appearing in FIGS. 2 and 6.
Figure 9:
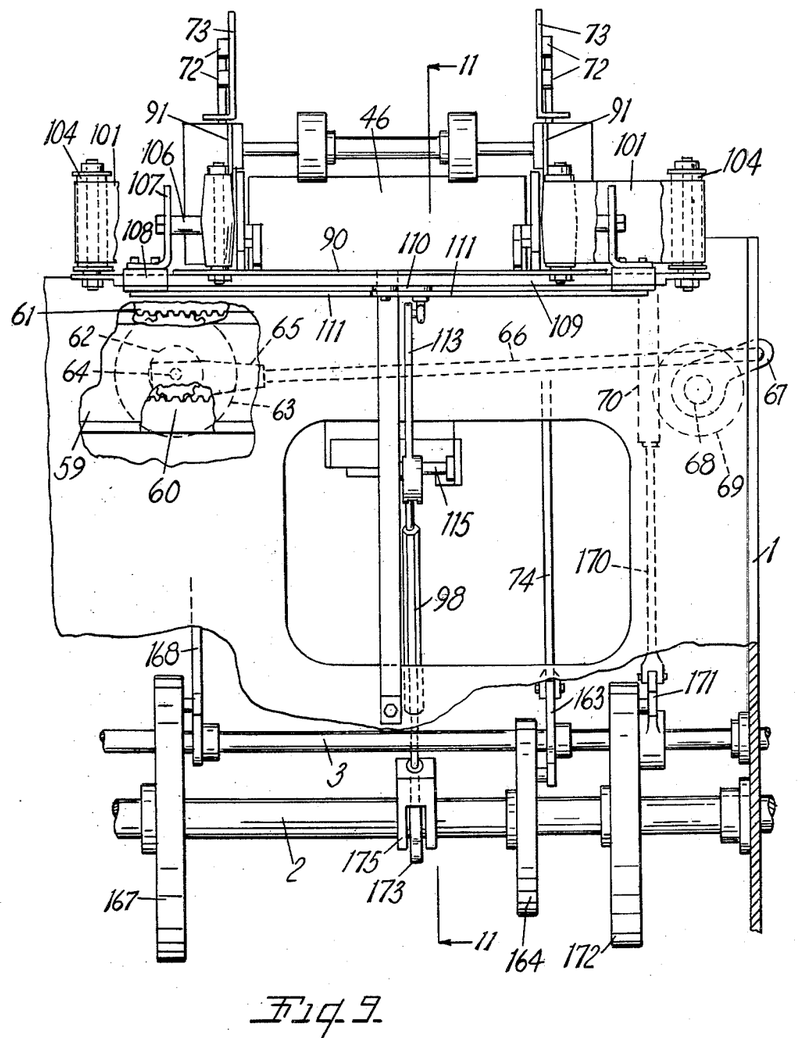
FIG. 9 is an enlarged fragmentary front elevational view of the off-feeding or package delivery and sealing mechanism of the machine with parts thereof broken away.
Figures 11, 12:
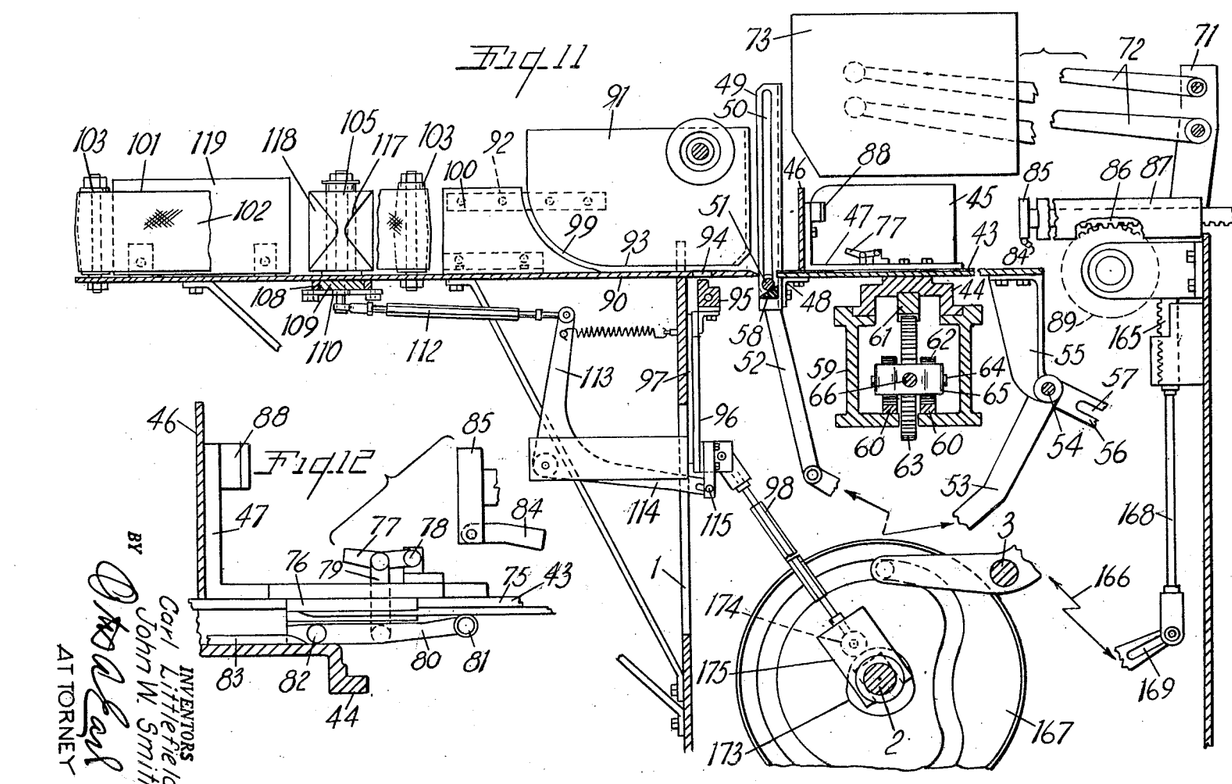
FIG. 11 is a fragmentary vertical cross sectional view taken along the plane of the lines 11—11 in FIGS. 9 and 10.
FIG. 12 is an enlarged fragmentary vertical cross sectional view through the pusher retracting interlock of the off-feeding mechanism shown in FIGS. 10 and 11.

The carriage plate 43 and the folding mechanism thereon is translated laterally between the infeeding station C and the off-feeding station E by mechanism which is disclosed more clearly in FIGS. 6, 9 and 11. A channeled cross bar 59 of relatively heavy section forms a slide way for the slide base 44 of the carriage plate. A pair of fixed racks 60 are mounted within the base of the cross member 59 and an inverted movable rack bar 61 is mounted on the underside of the carriage slide 44. Coacting between the rack bars 60 and 61 is a differential pinion assembly consisting of small side gears or pinions 62 engaged with the fixed rack bars 60 and a large rack or pinion 63 engaged with the movable rack bar 61. The gears 62 and 63 are drivingly connected to a common shaft 64 and the shaft 64 is journaled in the arms of a yoke 65.

The yoke 65 is horizontally reciprocated to move the differential pinions relative to the rack bars 60 and 61. A connecting rod 66 extends from the yoke 65 to a crank 67 mounted on the end of a rock shaft 68 at the right side of the machine base 1. The rock shaft 68 carries a gear 69 on its rear end (see FIG. 9) which is engaged and oscillated by a vertical rack bar 70 as will be described in greater detail presently.

The action of the carriage driving mechanism is such that a relatively small throw of the crank 67 and corresponding short travel of the yoke 65 is multiplied by the differential gears 62—63 to move the moveable rack bar 61 and the carriage rapidly from the infeeding station to the off feeding station E.

Figure 10:
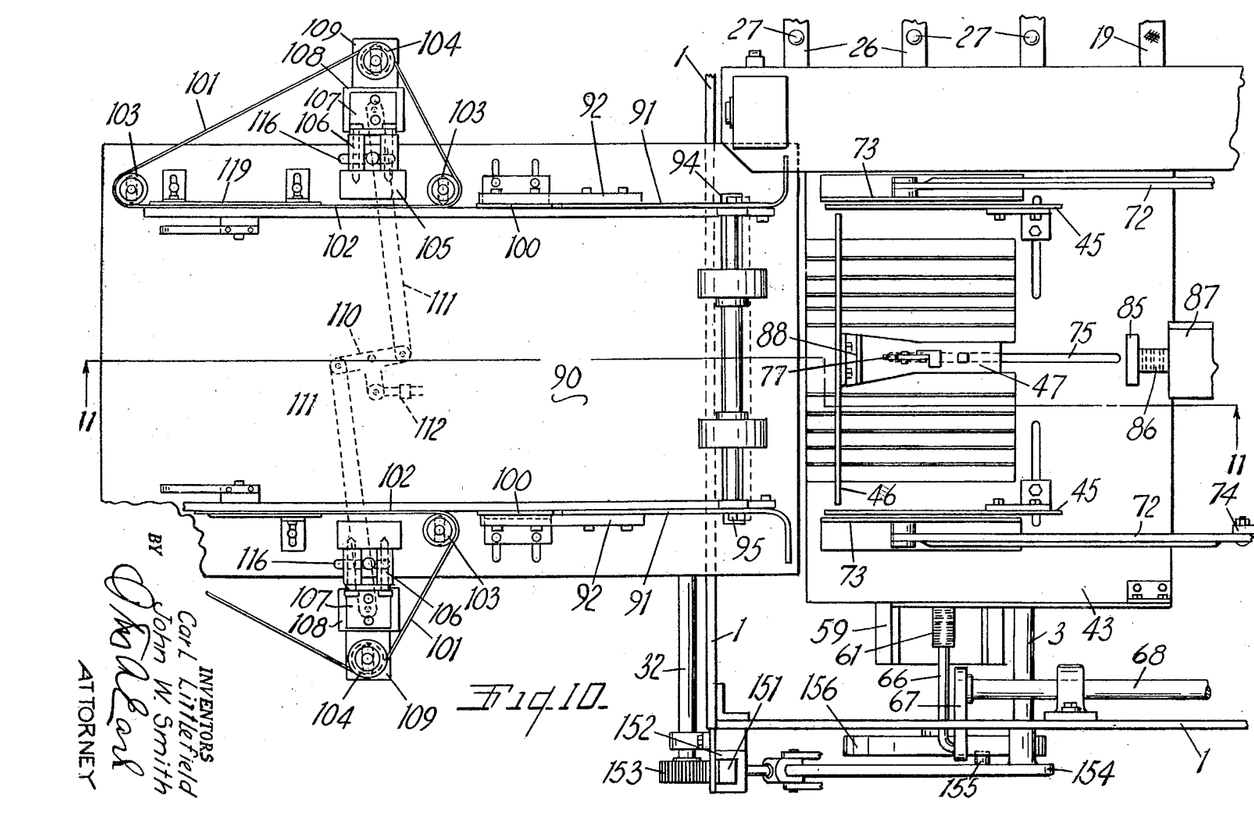
FIG. 10 is an enlarged fragmentary top plane view of the off-feeding and sealing mechanism shown in FIG. 9.

At the off feeding station at the right side of the machine there are provided a pair of upright supports 71 having parallel folder arms 72 mounted thereon and supporting end folder plates 73 which are spaced to swing vertically along the outer sides of the end plates 45 on the carriage when the carriage is in the off-feeding position. The folder arms 72 are swung upwardly and downwardly by means of a vertical push rod 74 (see FIGS. 1, 9 and 10) the driving connections to which will be described presently. The action of the folder plates descending along the outer sides of the end plates 45 on the carriage plate 43 is to fold down the projecting upper sides of the tubular wrapper and form top end folds on the package. (See FIG. 14D.) These folds will be separated from the rear end folds for the time being by the end plates 45 which originally formed the rear end folds. The plates 73 control the top end folds until the package is received by other folding plates as will be described.

After the top end folds are formed the back plate 46 on the carriage plate is pushed forwardly to eject the package from the carriage. The mechanism for accomplishing this operation is shown more clearly in FIGS. 11 and 12. The bracket 47 which supports the back plate 46 is slidingly guided in a slot 75 in the carriage plate by a depending shoe 76. A pawl 77 pivoted on the bracket at 78 is connected by a depending link 79 with a cam lever 80 on the underside of the carriage plate. The cam lever 80 is pivoted to the carriage plate at 81 and carries a follower roll 82 arranged to ride upon a rib 83 positioned transversely on the top of the slide member 44 underneath the carriage plate. The pawl 77 coacts with a pawl 84 on the reciprocable pusher element 85 to retract the bracket 47 and the back plate 46. The pusher element 85 is advanced and retracted horizontally by a rack bar 86 operating in the guide way 87 and the pusher element 85 coacts with a bumper 88 on the upper part of the bracket 47.

The back plate 46 and its supporting bracket 47 will always be advanced to the same position substantially to the front edge of the carriage plate to eject the package from the carriage plate but since the back plate 46 forms the rear stop or positioner for packages which may vary in size the retracted position of the back plate must be adjustable and a releasable retracting conection is provided by the pawls 77 and 84 for this reason. The shoe 76 on which the pawl 77 is mounted is adjustable along the bracket 47 so that the follower roll 82 will be moved rearwardly and downwardly off of the cam 83 at the desired retracted position of the back plate 46. This lowers the pawl 77 and disengages it from driving connection with the pawl 84 and permits continued retraction of the pusher 85 to clear the end plates 45 for reciprocating motion of the carriage plate. On the advancing stroke of the pusher element 85 the pawl 84 slides over the retracting pawl 77 and the pusher element engages the abutment 88 moving the back plate forwardly to package ejecting position and also moving the follower roll 82 up on the cam rib 83 to condition the pawls for retracting engagement. The rack bar 86 is reciprocated by an oscillating gear or pinion 89 (see FIG. 11), the driving connections to which will be described presently.

Upon being ejected or off-fed forwardly from the carriage plate 43 the partially wrapped package is pushed onto a plate 90 forming an off-feeding or package delivery way. In moving from the carriage plate 43 to the plate 90 the depending front edge of the wrapper which was pulled below the front edge of the carriage plate by the front folding bar 51 is pressed rearwardly along the bottom of the package completing the circumferential wrap around the package. At the same time the ends of the package are pressed between two adjustably fixed side plates 91 which engage the projecting forward ends of the wrapper sheet and form front end folds in the wrapper. (See FIG. 14E.) The side plates 91 are spaced above the bottom plate 90 by supporting bars 92 to leave slots 93 receiving the projecting bottom end flaps which remain extended beyond the ends of the package. The wrapping of the package is then almost complete and the carriage plate 43 can be returned to the infeeding station for a succeeding package while the first package remains between the side plates 91.

The bottom plate 90 defines a transverse slot 94 through which a heated bottom seal bar 95 is vertically reciprocable to fuse and seal the overlapping bottom folds on the package as the package rests between the side plates 91. The bottom seal bar 95 is carried by a vertically reciprocable slide 96 supported in suitable guide ways 97 on the front wall of the base 1 below the bottom plate 90. A cam actuated push rod 98 reciprocates the slide 96 and the bottom seal bar in timed relation with the other elements of the machine as will be described.

After having the wrapper sheets sealed along their bottom surfaces the packages are advanced along the bottom panel 90 in a step by step manner as each succeeding package delivered from the carriage plate pushes the line of packages ahead of it. The bottom slot 93 formed below the side plates 91 curves upwardly as at 99 along the side plate extension 100 to plow or fold up the bottom end flaps in a well known manner against the ends of the packages. After passing the end plate extensions 100 the packages are advanced between two opposed belt loops 101 having parallel side reaches or runs 102 which engage and hold the overlapped end folds on the package. The belt loops 101 are not driven but idle freely around upright pulleys 103 and 104 so that the belts are advanced solely by driving engagement with the packages themselves. Desirably the belts are of a heat resistant material such as woven fiber glass and may be further treated with an inert anti-friction coating such as Teflon.

After passing the lead pulleys 103 the opposed reaches 102 of the belts span a laterally unsupported area behind which are mounted heated end sealing blocks 105. The blocks 105 are carried by spacers 106 and brackets 107 on slides 108. The slides 108 are in turn slidingly supported on the ends of a cross bar 109 projecting from the bottom of the bottom plate 90. A bell crank 110 mounted below the center of the bottom plate is connected to the two slides 108 by links 111 to simultaneously and oppositely reciprocate the slides and the end sealing blocks 105 carried thereby. The bell crank 110 is actuated by linkage including the push rod 112 and crank 113 (see FIG. 11) having one arm 114 engaged with a pin 115 on the bottom seal actuating slide 96.

The projecting slide supporting cross bars 109 are adjustable longitudinally along the bottom panel 90 by mounting connections in the slots 116 (see FIG. 10) so as to position the end sealing blocks opposite the ends of a package in the series of packages being pressed along the off-feeding way. During the interval that the package is stationary opposite the end sealing blocks, the blocks are reciprocated momentarily to press the blocks against the belt reaches 102 and transmit heat and pressure through the belt to fuse the overlapped end folds on the package. The inert or non-adhesive character of the belts 101 prevents the fused wrapper material from adhering to the belt but at the same time the belt holds the folds of the wrapper together for the period in which the wrapper material is weakened due to its heated condition. The heated sealing blocks themselves can retract freely from the back sides of the belts as there is no tendency of the belt to adhere to the heated block.

In order to assure that the several overlapped end folds in the wrapper film are uniformly fused and sealed together it is desirable to emboss or recess the face of the heating blocks 105 as is shown in FIG. 11 where the lines 117 indicate the edges of a raised hourglass shaped with recessed areas 118 on each side thereof. The raised land provides first contact of the sealing block where the end folds of the wrapper are thickest so as to effectively conduct the necessary heat to seal these areas while the recesses 118 receive the thinner portions of the end folds and prevent the application of excess heat to them.

After passing the end sealing blocks 105 the ends of the newly sealed packages and the belts 102 are supported for a short distance by plates 119 which permit the sealed end folds to cool thoroughly prior to ejecting the sealed package from between the belts and peeling the belts away from the ends of the package.

As stated earlier the several elements of the machine are driven and coordinated from a common cam shaft 2. The mechanism for driving the wrapper web feed rolls 14 appears most clearly in FIGS. 1, 2, 6 and 7. At the left end of the machine as appears in FIG. 1 and as is shown in elevation in FIG. 2, the cam shaft 2 is provided with a crank wheel 120 with a radial slot 121 therein. A crank pin 122 is adjustable in the slot to have a variable throw and is connected through the connecting rod 123 to a vertical rack bar 124. Reciprocation of the rack bar through a distance which is variable according to the adjustment of the pin 122 oscillates the pinion 125 on the shaft 126. The shaft 126 drives a chain 127 which in turn drives the sprocket 128 on the end of the feed roll shaft 14. The sprocket 128 is freely rotatable on the shaft but drives the shaft through the ratchet 129 on the advancing stroke of the rack bar 124. The ratchet housing 130 idles relative to the sprocket 128 when the rack bar is retracted.

In order to drive the feed belts 20 at the same speed as the web feed roll 14 to receive and carry away the infeeding web, a sprocket 131 on the shaft 14 is connected by means of the chain 132 to a sprocket 133 on the shaft 22 which drives the feed belts. A sprocket 133 idles on the shaft 22 but drives the shaft in advancing direction through a second ratchet 134. Since the primary drive chain 127 is disconnected from the first ratchet housing 130 on retracting motion of the first chain, the feed belts are not retracted. Simultaneously with the feeding cycle of the feed roll 14, the crank wheel 120 rotates a cam 135 (see FIG. 2) to actuate the cam follower 136 on the crank 137. The crank 137 imparts motion to vertical push rods 18 to impart reciprocating motion to the movable cutter bar 17 to cut off the individual wrapper sheets at the end of the advancing motion of the feed roll 14.

Since the leading edge of the wrapper sheet must be advanced to a centered position over the infeeding station and since the length of the wrapper sheet will vary with the length of the package being wrapped and with the adjustment of the crank pin 122, it is often necessary to advance the feed belts 20 beyond and after the feeding motion of the web feed roll 14 has stopped. To accomplish this over feeding of the web feed belts, the belt feed shaft 22 is provided with a second ratchet 138 and associated sprocket 139. The sprocket 139 is driven by a chain 140 from the shaft 141 and the shaft is in turn driven by a pinion 142 actuated by the rack bar 143 (see FIG. 6). The rack bar 143 is vertically reciprocated through variable distances by the push rod 144 having an adjustable connection at 145 to the crank lever 146. The crank lever 146 is driven through the link 147 from a crank 148 and the crank 148 has a follower 149 engaged with a cam 150 on the cam shaft 2. Thus by adjustment of the connection 145 radially on the lever 146, the shaft 141 and chain 140 can be made to advance the feed belts a predetermined distance to locate the leading edge of the wrapper sheet in the desired position over the infeeding stations C. The ratchet 138 permits retracting motion of the chain 140 with the rack 143.

The function of the vertically reciprocating rack bars 30 and the grippers 36 carried thereby in pulling down the new wrapper sheet in front of the infeeding station has been described. As noted the pinions 31 and shaft 32 impart the desired motion to the rack bars. Oscillation of the shaft 32 is accomplished by a vertically reciprocable rack bar 151 slidably mounted on the right end of the machine as shown in FIG. 1 by means of a guide 152. The rack bar engages and oscillates the pinion 153 on the end of the shaft 32. Motion is imparted to the rack bar 151 by a crank lever 154 pivoted on the rock shaft 3 and having a follower 155 engaged with the cam 156 on the extreme end of the cam shaft.

Vertical reciprocating motion of the front folding bar 51 is accomplished by oscillation of the shaft 54 and the crank lever 56. This motion is accomplished by a horizontally extending actuating bar 157 riding in the slot 57 and swingably supported by levers 158. The levers 158 are oscillated upwardly and downwardly by a connecting rod 159 engaged with the crank lever 160 pivoted on the rock shaft 3. The lever 160 carries a follower 161 engaged with the cam 162 on the cam shaft 2 so the mechanism is driven in properly timed relation to the other parts of the machine.

The motion for vertically swinging the end folder plates 73 is created by the previously described push rod 74 which operates directly from a crank lever 163 (see FIGS. 1 and 9) driven by the cam 164. The pinion 89 which reciprocates the pusher element 85 for ejecting packages at the off-feeding station is driven by reciprocating motion of the vertical rack bar 165 (see FIG. 11) driven by a crank lever 166 from the cam 167. It will be noted that the push rod 168 which connects the rack bar to the crank lever is adjustable radially in the slot 169 to vary the stroke of the rack bar 165. This is to vary the distances through which the pusher 85 will be reciprocated to accommodate relatively narrow and relatively thick packages.

The driving connection for reciprocating the vertical rack bar 70 which drives the carriage translating mechanism consists of a push rod 170 (see FIG. 9) driven by a lever 171 having a cam follower engaged with the cam 172 on the cam shaft. The previously described push rod 98 which actuates the bottom sealing element 95 and the end sealing blocks 105 is driven by a cam 173 on the cam shaft engaged with the follower 174 carried by the yoke 175 on the lower end of the push rod 98.

From the foregoing it will be seen that a single rotation or cycle of the cam shaft 2 will drive all of the elements of the machine and that by properly angularly adjusting the several cams the several elements of the machine operate in proper timed relation. No attempt has been made to show the specific angularly rotated positions of the cams as their adjustment on the cam shaft is believed to be within the skill of the ordinary mechanic having the desired sequence of operations in mind. With particular reference to the conventional illustration in FIG. 14 it will be noted that the sequence of operation of the machine is to position a wrapper web W vertically in front of the infeeding station where the pusher 7 may push the package P against the wrapper moving the wrapper rearwardly to the carriage plate 43. As shown in section B of FIG. 14 the end plates 45 on the carriage plate create rear end folds 176 at the ends of the package and the wrapper is folded partially under the package as at 177. The carriage is then translated to the off-feeding position as shown in FIG. 14C. Before or during the translating motion of the carriage plate the top folding bar 51 is lowered to fold the top of the wrapper downwardly across the front of the package. At the off-feeding station the end folding plates 73 are lowered to form top end folds 178 as shown in FIG. 14D. The next operation is for the back plate 46 to be pushed forwardly to eject the package onto the bottom plate 90 of the off-feeding way as shown in 14E. In so doing the bottom or front edge of the wrapper W is folded underneath the package as at 179 and front end folds 180 are formed in the projecting ends of the wrapper by a passage between the side plates 91. The bottom seal element 95 is pressed upwardly to seal the overlapped bottom folds of the wrapper at this point. The package is then advanced as shown in 14F so that the projecting lower edge of the wrapper is folded upwardly by the slot 99 in a lower end flap 181 and the package is delivered to between the retaining belts 101 for sealing of the end folds as has already been described.

In order to initiate the cycle of operation of the cam shaft 2 to perform the several folding and sealing steps the pusher 7 is provided with the pawl 8 to actuate the mechanism for engaging the one revolutionary clutch 5. The structure and operation of the pawl 8 is more particularly shown in FIG. 13 wherein it will be seen that the pawl 8 engages the tappet 9 upon inward motion of the pusher plate 7. However, the pawl 9 is pivoted at 182 on a crank 183 so that no motion or action occurs upon inward motion of the tappet 8. This is to prevent actuation of the mechanism while the operator is manually advancing a package into the infeeding station. Upon retracting motion of the package delivery slide 7, the back of the tappet 8 strikes the pawl 9 which then functions through the abutment 184 to rock the crank 183 clockwise and push downwardly on the push rod 185. Depression of the push rod oscillates the crank 186 and rocks the latch pawl 187 connected thereto out of engagement with the trip lever 188 of the one revolution clutch. The lever 188 is pivoted on the rock shaft 3 and is raised to retract the holding pawl 189 out of the notch in the clutch plate 190 to permit rotation of the cam shaft 2 by the one revolution clutch as will be understood. Upon completing the rotational cycle of the cam shaft, the pawl 189 is moved by part of the clutch not illustrated into the locking position as is common in one revolution clutches and the latch 187 re-engages the lever 188. Rotation of the cam shaft 2 actuates all the functions of the machine as described and when the clutch is returned to its starting position the carriage 43 is necessarily returned to receiving position and ready to start a succeeding cycle of the machine.

What is claimed as new is:

1. A package wrapping machine comprising an infeed station, an outfeed station and an end seal station, a carriage transversely reciprocable between said infeed and outfeed stations and having end folding plates arranged to receive the ends of a package advanced transversely therebetween and a movable back plate movable transversely between said end plates to eject a package at said outfeed station, wrapper sheet feed means comprising feed belts positioned over said infeed station with sheet retaining balls rollingly engaged with the foremost belt and means for advancing a web of wrapping material to said belts and severing a sheet from the end of the web for variable advance by said belts, a sheet gripper frame vertically reciprocable across the front of said infeed station and having jaws arranged to grip the front edge of a sheet held by said belts and balls and pull the sheet down into vertical position prior to infeeding a package to said infeed station, manually operable means for advancing a package transversely of said vertical sheet whereby the sheet is folded over the back bottom and top of the package and rear end tucks are formed therein by said end plates, said manually operable means being connected to initiate mechanical operation of succeeding wrapping operations, a front fold bar extending transversely across the front of said carriage and vertically reciprocable from an elevated position above said infeed station but below said belts and behind said gripper frame when said carriage is at said infeed station, cam actuated means connected to lower said front fold bar after a package is fed onto said carriage and while said carriage is moving to fold the trailing edge of said sheet down over the front of said package, second cam actuated means including a fixed rack and a movable rack on said carriage and different sized pinions engaged with said racks and connected to reciprocable drive means driven by said second cam actuated means to reciprocate said carriage between said infeed and outfeed stations, end fold plates vertically reciprocable along the outer sides of said end plates at the outfeed station to form top end folds in said wrapper sheet, third cam actuated means connected to reciprocate said end fold plates, a reciprocable element engageable with said back plate at said outfeed station to push a package out of the front of said carriage to said end seal station and retract the back plate between said end plate, means forming an automatically disengageable retracting connection between said back plate and said reciprocable element, fourth cam actuated means connected to drive said reciprocable element, a bottom part in said end seal station forming a package supporting way and arranged to fold the trailing end of said wrapper sheet under the bottom of said package, a heated bottom seal bar reciprocable through said bottom part in timed relation with said reciprocable element to seal the bottom folds of said wrapper along the bottom of said package, fifth cam actuated means connected to actuate said bottom seal bar, upright side plates on said bottom part arranged to form front end folds in said wrapper as the package is pushed between the side plates, said side plates having upwardly inclined slots arranged to receive and fold up lower end flaps in said wrapper, upright rollers freely rotatably supporting loops of non-sticky and heat insensitive material with a reach of each belt extending as a continuation of said side plates to engage and advance with the ends of package on said bottom part and hold the end folds of the wrapper in place, heated plates positioned within said belt loops, sixth cam actuated means connected to reciprocate said heated plates into contact with said reaches of said belts to heat said end folds through said belts and fuse the end folds on the package, said heated plates having faces that are recessed in the area of the lower end folds of the wrappers, said reaches of said belts continuing beyond said heated plates to provide cooling space for said end folds prior to retracting motion of the belts around said loops from the ends of the package, and a cam shaft driven through a single cycle of operation in response to actuation of said manually operable means and connected to actuate said several cam actuated means in timed relation.

2. A package wrapping machine comprising an infeed station, an outfeed station and an end seal station, a carriage transversely reciprocable between said infeed and outfeed stations and having end folding plates arranged to receive the ends of a package advanced transversely therebetween and a movable back plate movable transversely between said end plates to eject a package at said outfeed station, wrapper sheet feed means comprising feed belts positioned over said infeed station wtih sheet retaining balls rollingly engaged with one of the belts and means for advancing a web of wrapping material to said belts and severing a sheet from the end of the web for variable advance by said belts, a sheet gripper frame vertically reciprocable across the front of said infeed station and having jaws arranged to grip the front edge of a sheet held by said belts and balls and pull the sheet down into vertical position prior to infeeding a package to said infeed station, manually operable means for advancing a package transversely of said vertical sheet whereby the sheet is folded over the back, bottom and top of the package and rear end tucks are formed therein by said end plates, a front fold bar extending transversely across the front of said carriage and vertically reciprocable from an elevated position above said infeed station but below said belts and behind said gripper frame when said carriage is at said infeed station, means connected to lower said front fold bar after a package is fed onto said carriage to fold the trailing edge of said sheet down over the front of said package, second cam actuated means to reciprocate said carriage between said infeed and outfeed stations, end fold plates vertically reciprocable along the outer sides of said end plates at the outfeed station to form top end folds in said wrapper sheet, means connected to re-ciprocate said end fold plates, a reciprocable element engageable with said back plate at said outfeed station to push a package out of the front of said carriage to said end seal station and retract the back plate between said end plates, means forming an automatically disengageable retracting connection between said back plate and said reciprocable element, means connected to drive said reciprocable element, a bottom part in said end seal station forming a package supporting way and arranged to fold the trailing end of said wrapper sheet under the bottom of said package, upright side plates on said bottom part arranged to form front end folds in said wrapper as the package is pushed between the side plates, said side plates having upwardly inclined slots arranged to receive and fold up lower end flaps in said wrapper, upright rollers freely rotatably supporting loops of non-sticky and heat insensitive material with a reach of each belt extending as a continuation of said side plates to engage and advance with the ends of package on said bottom part and hold the end folds of the wrapper in place, heated plates positioned within said belt loops, and means connected to reciprocate said heated plates into contact with said reaches of said belts to heat said end folds through said belts and fuse the end folds on the package, said heated plates having faces that are recessed in the area of the lower end folds of the wrappers, said reaches of said belts continuing beyond said heated plates to provide cooling space for said end folds prior to retracting motion of the belts around said loops from the ends of the package.

3. A package wrapping machine comprising an infeed station, an outfeed station and an end seal station, a carriage transversely reciprocable between said infeed and outfeed stations and having end folding plates arranged to receive the ends of a package advanced transversely therebetween and a moveable back plate moveable transversely between said end plates to eject a package at said outfeed station, wrapper sheet feed means comprising feed belts positioned over said infeed station with sheet retaining balls rollingly engaged with a forwardly disposed belt and means for advancing a web of wrapping material to said belts and severing a sheet from the end of the web for variable advance by said belts, a sheet gripper frame vertically reciprocable across the front of said infeed station and having jaws arranged to grip the front edge of a sheet held by said belts and balls and pull the sheet down into vertical position prior to infeeding a package to said infeed station, manually operable means for advancing a package transversely of said vertical sheet whereby the sheet is folded over the back, bottom and top of the package and rear end tucks are formed therein by said end plates, a front fold bar extending transversely across the front of said carriage and vertically reciprocable from an elevated position above said infeed station but below said belts and behind said gripper frame when said carriage is at said infeed station, cam actuated means connected to lower said front fold bar after a package is fed into said carriage and while said carriage is moving to fold the trailing edge of said sheet down over the front of said package, second cam actuated means including a fixed rack and a movable rack on said carriage and different sized pinions engaged with said racks and connected to reciprocable drive means driven by said second cam actuated means to reciprocate said carriage between said infeed and outfeed stations, end fold plates vertically reciprocable along the outer sides of said end plates at the outfeed station to form top end folds in said wrapper sheet, third cam actuated means connected to reciprocate said end fold plates, a reciprocable element engageable with said back plate at said outfeed station to push a package out of the front of said carriage to said end seal station and retract the back plate between said end plate, means forming an automatically disengageable retracting connection between said back plate and said reciprocable element, fourth cam actuated means connected to drive said reciprocable element, a bottom part in said end seal station forming a package supporting way and arranged to fold the trailing end of said wrapper sheet under the bottom of said package, upright side plates on said bottom part arranged to form front end folds in said wrapper as the package is pushed between the side plates, said side plates having upwardly inclined slots arranged to receive and fold up lower end flaps in said wrapper, upright rollers freely rotatably supporting loops of non-sticky and heat insensitive material with a reach of each belt extending as a continuation of said side plates to engage and advance with the ends of packages on said bottom part and hold the end folds of the wrapper in place, heated plates positioned within said belt loops, fifth cam actuated means connected to reciprocate said heated plates into contact with said reaches of said belts to heat said end folds through said belts and fuse the end folds on the package, said heated plates having faces that are recessed in the area of the lower end folds of the wrappers, said reaches of said belts continuing beyond said heated plates to provide cooling space for said end folds prior to retracting motion of the belts around said loops from the ends of the package, and a cam shaft driven through a single cycle of operation in response to actuation of said manually operable means and connected to actuate said several cam actuated means in timed relation.

4. A package wrapping machine comprising an infeed station, an outfeed station and an end seal station, a carriage transversely reciprocable between said infeed and outfeed stations and having end folding plates arranged to receive the ends of a package advanced transversely therebetween and a moveable back plate moveable transversely between said end plates to eject a package at said outfeed station, wrapper sheet feed means comprising feed belts positioned over said infeed station with sheet retaining balls rollingly engaged with a forwardly disposed belt and means for advancing a web of wrapping material to said belts and severing a sheet from the end of the web for variable advance by said belts, a sheet gripper frame vertically reciprocable across the front of said infeed station and having jaws arranged to grip the front edge of a sheet held by said belts and balls and pull the sheet down into vertical position prior to infeeding a package to said infeed station, manually operable means for advancing a package transversely of said vertical sheet whereby the sheet is folded over the back, bottom and top of the package and rear end tucks are formed therein by said end plates, a front fold bar extending transversely across the front of said carriage and vertically reciprocable from an elevated position above said infeed station but below said belts and behind said gripper frame when said carriage is at said infeed station, cam actuated means connected to lower said front fold bar after a package is fed into said carriage to fold the trailing edge of said sheet down over the front of said package, second cam actuated means to reciprocate said carriage between said infeed and outfeed stations, end fold plates vertically reciprocable along the outer sides of said end plates at the outfeed station to form top end folds in said wrapper sheet, third cam actuated means connected to reciprocate said end fold plates, a reciprocable element engageable with said back plate at said outfeed station to push a package out of the front of said carriage to said end seal station and retracted the back plate between said end plate, means forming an automatically disengageable retracting connection between said back plate and said reciprocable element, fourth cam actuated means connected to drive said reciprocable element, a bottom part in said end seal station forming a package supporting way and arranged to fold the trailing end of said wrapper sheet under the bottom of said package, upright side plates on said bottom part arranged to form front end folds in said wrapper as the package is pushed between the side plates, said side plates having upwardly inclined slots arranged to receive and fold up lower end flaps in said wrapper, upright rollers freely rotatably supporting loops of non-sticky and heat insensitive material with a reach of each belt extending as a continuation of said side plates to engage and advance with the ends of packages on said bottom part and hold the end folds of the wrapper in place, heated plates positioned within said belt loops, fifth cam actuated means connected to reciprocate said heated plates into contact with said reaches of said belts to heat said end folds through said belts and fuse the end folds on the package, said reaches of said belts continuing beyond said heated plates to provide cooling space for said end folds prior to retracting motion of the belts around said loops from the ends of the package, and a cam shaft driven through a single cycle of operation in response to actuation of said manually operable means and connected to actuate said several cam actuated means in timed relation.

5. A package wrapping machine comprising an infeed station, an outfeed station and an end seal station, a carriage transversely reciprocable between said infeed and outfeed stations and having end folding plates arranged to receive the ends of a package advanced transversely therebetween and a movable back plate movable transversely between said end plates to eject a package at said outfeed station, wrapper sheet feed means positioned over said infeed station, sheet gripper jaws vertically reciprocable in front of said infeed station and arranged to grip the front edge of a sheet held by said sheet feed means and pull the sheet down into vertical position prior to infeeding a package to said infeed station, manually operable means for advancing a package transversely of said vertical sheet whereby the sheet is folded over the back, bottom and top of the package and rear end tucks are formed therein by said end plates, a front fold bar extending transversely across the front of said carriage and vertically reciprocable from an elevated position above said infeed station but below said sheet feed means and behind said gripper jaws when said carriage is at said infeed station, means connected to lower said front fold bar after a package is fed onto said carriage to fold the trailing edge of said sheet down over the front of said package, drive means to reciprocate said carriage between said infeed and outfeed stations, end fold plates vertically reciprocable along the outer sides of said end plates at the outfeed station to form top end folds in said wrapper sheet, means connected to reciprocate said end fold plates, a reciprocable element engageable with said back plate at said outfeed station to push a package out of the front of said carriage to said end seal station and retract the back plate between said end plates, means forming an automatically disengageable retracting connection between said back plate and said reciprocable element, means connected to drive said reciprocable element, a bottom part in said end seal station forming a package supporting way and arranged to fold the trailing end of said wrapper sheet under the bottom of said package, upright side plates on said bottom part arranged to form front end folds in said wrapper as the package is pushed between the side plates, said side plates having upwardly inclined slots arranged to receive and fold up lower end flaps in said wrapper, upright rollers freely rotatably supporting loops of non-sticky and heat insensitive material with a reach of each belt extending as a continuation of said side plates to engage and advance with the ends of a package on said bottom part and hold the end folds of the wrapper in place, heated plates positioned within said belt loops, and means connected to reciprocate said heated plates into contact with said reaches of said belts to heat said end folds through said belts and fuse the end folds on the package, said reaches of said belts continuing beyond said heated plates to provide cooling space for said end folds prior to retracting motion of the belts around said loops from the ends of the package.

6. A package wrapping machine comprising an infeed station, an outfeed station and an end seal station, a carriage transversely reciprocable between said infeed and outfeed stations and having end folding plates arranged to receive the ends of a package advanced transversely therebetween and a movable back plate movable transversely between said end plates to eject a package at said outfeed station, wrapper sheet feed means positioned over said infeed station, sheet gripper jaws vertically reciprocable in front of said infeed station and arranged to grip the front edge of a sheet held by said sheet feed means and pull the sheet down into vertical position prior to infeeding a package to said infeed station, manually operable means for advancing a package transversely of said vertical sheet whereby the sheet is folded over the back, bottom and top of the package and rear end tucks are formed therein by said end plates, drive means to reciprocate said carriage between said infeed and outfeed stations, end fold plates vertically reciprocable along the outer sides of said end plates at the outfeed station to form top end folds in said wrapper sheet, means connected to reciprocate said end fold plates, a reciprocable element engageable with said back plate at said outfeed station to push a package out of the front of said carriage to said end seal station and retract the back plate between said end plates, means connected to drive said reciprocable element, a bottom part in said end seal station forming a package supporting way and arranged to fold the trailing end of said wrapper sheet under the bottom of said package, upright side plates on said bottom part arranged to form front end folds in said wrapper as the package is pushed between the side plates, said side plates having upwardly inclined slots arranged to receive and fold up lower end flaps in said wrapper, upright rollers freely rotatably supporting loops of non-sticky and heat insensitive material with a reach of each belt extending as a continuation of said side plates to engage and advance with the ends of a package on said bottom part and hold the end folds of the wrapper in place, heated plates positioned within said belt loops, and means connected to reciprocate said heated plates into contact with said reaches of said belts to heat said end folds through said belts and fuse the end folds on the package, said reaches of said belts continuing beyond said heated plates to provide cooling space for said end folds prior to retracting motion of the belts around said loops from the ends of the package.

7. Wrapper feed means for a machine having a horizontally reciprocable package carriage with a front folding bar vertically reciprocable in horizontal position across the front of the carriage, said feed means comprising feed rolls arranged to deliver the end of a web of limp polyolefin film from a supply roll, a series of spaced feed belts positioned to receive and advance said web from said feed rolls, said belts being positioned over the raised position of said folding bar and the retracted position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and including a first rack and pinion and an adjustable throw crank connected to the rack to vary the length of the feeding motion and a first ratchet to disconnect the rolls from the rack on the retracting motion of the rolls and the rack, a knife positioned to cut a wrapper sheet from the leading end of said web and connected to be actuated at the end of the feeding motion of said feed rolls and said first rack, a second drive connected to the driven part of said first ratchet and connected to a second ratchet, said second ratchet having a one way driving connection to said belts to drive said belts with said rolls, a third drive including a third ratchet having a one way driving connection to said belts to advance the belts independently of said rolls, actuating means including an adjustable throw crank and a connected second rack and pinion connected to the driving part of said third ratchet to activate said third drive during retracting motion of said first drive, linkage carried by said carriage to reciprocate said folding bar, a lever having a rod engageable with said linkage in reciprocated positions of said carriage, a frame vertically reciprocable in front of said belts and having spring closed grippers at its top, means to open said grippers at the top and bottom of the travel of said frame to grip said sheet and pull it down from said belts, a fourth drive connected to reciprocate said frame, and cyclically driven cam means connected to drive said several drive means and said lever in timed relation.

8. Wrapper feed means for a machine having a horizontally reciprocable package carriage with a front folding bar vertically reciprocable in horizontal position across the front of the carriage, said feed means comprising feed rolls arranged to deliver the end of a web of limp polyolefin film from a supply roll, a series of spaced feed belts positioned to receive and advance said web from said feed rolls, said belts being positioned over the raised position of said folding bar and the retracted position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and including an adjustable throw crank connected to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive including a third ratchet having a one way driving connection to said belts to advance the belts independently of said rolls, actuating means including an adjustable throw crank connected to the driving part of said third ratchet to activate said third drive during retracting motion of said first drive, linkage carriage by said carriage to reciprocate said folding bar, a lever having a rod engageable with said linkage in reciprocated positions of said carriage, grippers reciprocable in front of said belts, means to open said grippers at the top and bottom of their travel to grip said sheet and pull it down from said belts, a fourth drive connected to reciprocate said actuating means, and cyclically driven cam means connected to drive said several drive means and said lever in timed relation.

9. Wrapper feed means for a machine having a horizontally reciprocable package carriage, said feed means comprising feed rolls arranged to deliver the end of a web of limp polyolefin film from a supply roll, a series of spaced feed belts positioned to receive and advance said web from said feed rolls, said belts being positioned over the retraced position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and including an adjustable throw crank connected to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive including a third ratchet having a one way driving connection to said belts to advance the belts independently of said rolls, actuating means including an adjustable throw crank connected to the driving part of said third ratchet to activate said third drive during retracting motion of said first drive, grippers reciprocable in front of said belts, means to open said grippers at the top and bottom of their travel to grip said sheet and pull it down from said belts, a fourth drive connected to reciprocate said actuating means, and cyclically driven cam means connected to drive said several drive means in timed relation.

10. Wrapper feed means for a machine having a horizontally reciprocable package carriage, said feed means comprising feed rolls arranged to deliver the end of a web of limp film from a supply roll, a series of spaced feed belts positioned to receive and advance said web from said feed rolls, said belts being positioned over the retracted position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and including an adjustable throw crank connected to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive including a third ratchet having a one way driving connection to said belts to advance the belts independently of said rolls, actuating means including an adjustable throw crank connected to the driving part of said third ratchet to activate said third drive during retracting motion of said first drive, a frame vertically reciprocable in front of said belts and having spring closed grippers at its top, means to open said grippers at the top and bottom of the travel of said frame to grip said sheet and pull it down from said belts, a fourth drive connected to reciprocate said frame, and cyclically driven cam means connected to drive said several drive means and said actuating means in timed relation.

11. Wrapper feed means for a machine having a horizontally reciprocable package carriage, said feed means comprising feed rolls arranged to deliver the end of a web of limp film from a supply roll, a series of spaced feed belts positioned to receive and advance said web from said feed rolls, said belts being positioned over the retracted position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and including an adjustable throw crank connected to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive including a third ratchet having a one way driving connection to said belts to advance the belts independently of said rolls, actuating means including an adjustable throw crank connected to the driving part of said third ratchet to activate said third drive during retracting motion of said first drive, a frame vertically reciprocable in front of said belts and having grippers at its top, means to open and close said grippers at the top and bottom of the travel of said frame to grip said sheet and pull it down from said belts, a fourth drive connected to reciprocate said frame, and cyclically driven cam means connected to drive said several drive means and said actuating means in timed relation.

12. Wrapper feed means for a machine having a horizontally reciprocable package carriage with a front folding bar vertically reciprocable in horizontal position across the front of the carriage, said feed means comprising feed rolls arranged to deliver the end of a web of limp polyolefin film from a supply roll, a series of spaced feed belts positioned to receive and advance said web from said feed rolls, said belts being positioned over the raised position of said folding bar and the retracted position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and adjustable to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive having a one way driving connection to said belts to advance the belts independently of said rolls, actuating means including an adjustable throw crank connected to the driving part of said third ratchet to activate said third drive during retracting motion of said first drive, linkage carried by said carriage to reciprocate said folding bar, a lever having a rod engageable with said linkage in reciprocated positions of said carriage, a frame vertically reciprocable in front of said belts and having spring closed grippers at its top, means to open said grippers at the top and bottom of the travel of said frame to grip said sheet and pull it down from said belts, a fourth drive connected to reciprocate said frame, and cyclically driven means connected to drive said several drive means and said lever in timed relation.

13. Wrapper feed means for a machine having a horizontally reciprocable package carriage, said feed means comprising feed rolls arranged to deliver the end of a web of limp polyolefin film from a supply roll, a series of spaced feed belts positioned to receive and advance said web from said feed rolls, said belts being positioned over the retracted position of said carriage and a forwardly disposed belt of said series having a supporting bar below its upper web advancing reach, weighted balls rollingly supported and guided on said upper reach to restrain said web in contact with the belt, a first oscillatable drive connected to drive said rolls and adjustable to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive having a one way driving connection to said belts to advance the belts independently of said rolls, actuating means including an adjustable throw crank connected to the driving part of said third drive to activate said third drive during retracting motion of said first drive, a frame vertically reciprocable in front of said belts and having spring grippers opened at the top and bottom of the travel of said frame to grip said sheet and pull it down from said belts, a fourth drive connected to reciprocate said frame, and cyclically driven means connected to drive said several drive means in timed relation.

14. Wrapper feed means for a machine having a horizontally reciprocable package carriage, said feed means comprising feed rolls arranged to deliver the end of a web of limp polyolefin film from a supply roll, a series of spaced feed belts positioned to receive and advance said web from said feed rolls, said belts being positioned over the retracted position of said carriage, a first oscillatable drive connected to drive said rolls and adjustable to vary the length of the feeding motion and a first ratchet to disconnect the rolls on the retracting motion of the drive, a knife positioned to cut a wrapper sheet from the leading end of said web and connected to be actuated at the end of the feeding motion of said feed rolls, a second drive connected to the driven part of said first ratchet and connected to a second ratchet, said second ratchet having a one way driving connection to said belts to drive said belts with said rolls, a third drive having a one way driving connection to said belts to advance the belts independently of said rolls, actuating means including an adjustable throw crank connected to the driving part of said third drive to activate said third drive during retracting motion of said first drive, a frame vertically reciprocable in front of said belts and having spring grippers opened at the top and bottom of the travel of said frame to grip said sheet and pull it down from said belts, a fourth drive connected to reciprocate said frame, and cyclically driven means connected to drive said several drive means in timed relation.

15. In a packaging machine, a carriage transversely reciprocable between a front loading station and a front unloading station, end folding plates on said carriage with a back folding plate movable therebetween from front to rear, means arranged to advance a sheet of limp film wrapping material to a vertical position in front of the loading station, means to move a package rearwardly to between said plates to pull said sheet into bottom, back and top folds and form rear end tucks between said end plates, spaced vertically reciprocable plates located at said unloading station, means to lower said last plates down alongside said end plates to form top end folds in said sheet, means arranged to push said back plate from between said end plates and said vertically reciprocable plates at said unloading station, spaced stationary guide plates positioned to receive the package from said end plates and form front end folds in said sheet, said guide plates having slots inclined upwardly and rearwardly relative to their receiving ends to receive and fold up bottom end fold in said sheet, and end sealing means positioned to engage the ends of the package beyond said guide plates.

16. In a packaging machine, a carriage transversely reciprocable between a front loading station and a front unloading station, a back folding plate on said carriage movable from front to rear, means arranged to advance a sheet of limp film wrapping material to a vertical position in front of the loading station, means to move a package rearwardly to said plate to pull said sheet into bottom, back and top folds, spaced vertically reciprocable plates located at said unloading station, means to lower said last plates down alongside the ends of said plate to form top end folds in said sheet, means arranged to push said back plate from between said vertically reciprocable plates at said unloading station, spaced stationary guide plates positioned to receive the package from said end plates and form front end folds in said sheet, said guide plates having slots inclined upwardly and rearwardly relative to their receiving ends to receive and fold up bottom end fold in said sheet, and end sealing means positioned to engage the ends of the package beyond said guide plates.

17. In a packaging machine, a carriage transversely reciprocable between a loading station and an unloading station, end folding plates on said carriage with a back folding plate movable therebetween, means arranged to advance a sheet of limp film wrapping material to a vertical position in front of the loading station, means to move a package rearwardly to between said plates to pull said sheet into bottom, back and top folds and form rear end tucks between said end plates, spaced vertically reciprocable plates located at said unloading station, means to lower said last plates down alongside said end plates to form top end folds in said sheet, means arranged to push said back plate from between said end plates at said unloading station, spaced stationary guide plates positioned to receive the package from said end plates and form front end folds in said sheet, said guide plates having slots inclined upwardly and rearwardly relative to their receiving ends to receive and fold up bottom end folds in said sheet, and end sealing means positioned to engage the ends of the package beyond said guide plates.

18. In a packaging machine, a carriage transversely reciprocable between a front loading station and an unloading station, end folding plates on said carriage, means arranged to advance a sheet of limp film wrapping material to a vertical position in front of the loading station, means to move a package rearwardly to between said plates to pull said sheet into bottom, back and top folds and form rear end tucks between said end plates, spaced vertically reciprocable plates located at said unloading station, means to lower said last plates down alongside said end plates to form top end folds in said sheet, means arranged to push said package from between said end plates at said unloading station, spaced stationary guide plates positioned to receive the package from said end plates and form front end folds in said sheet, said guide plates having slots inclined upwardly and rearwardly relative to their receiving ends to receive and fold up bottom end fold in said sheet, and end sealing means positioned to engage the ends of the package beyond said guide plates.

19. A wrapping machine comprising a reciprocable carriage having spaced folding plates thereon positioned transversely to the path of motion of the carriage, a horizontal folding bar reciprocably mounted on said carriage for vertical movement in a plane transverse to said plates and alongside said carriage, means arranged to deliver a sheet of limp wrapping material to a horizontal position above a retracted position of said carriage, means arranged to pull an edge of said sheet downwardly in a vertical position on the opposite side of said plane from said carriage to below said carriage while restraining the upper trailing edge of the sheet whereby a package to be wrapped may be moved transversely of said plane onto said carriage and between said plates to fold said sheet over the back and parts of the top and bottom of the package, means connected to move said folding bar downwardly after a package is on the carriage to fold the upper portion of said sheet down over the top and front of said package and displace the restrained edge of the sheet to below the carriage, means connected to move said carriage parallel to said plane to opposite a discharge way, means operative upon the package on said carriage to form end folds in said sheet and means arranged to eject said package from said carriage transversely of said plane at said discharge position whereby the depending edge of the sheet at the front of the package is folded rearwardly under the package by the edge of said discharge way.

20. A wrapping machine comprising a reciprocable carriage, a horizontal folding bar reciprocably mounted on said carriage for vertical movement in a plane alongside said carriage, means arranged to deliver a sheet of limp wrapping material to a horizontal position above a retracted position of said carriage, means arranged to pull an edge of said sheet downwardly in a vertical position on the opposite side of said plane from said carriage to below said carriage while restraining the upper trailing edge of the sheet whereby a package to be wrapped may be moved transversely of said plane onto said carriage to fold said sheet over the back and parts of the top and bottom of the package, means connected to move said folding bar downwardly after a package is on the carriage to fold the upper portion of said sheet down over the top and front of said package and displace the restrained edge of the sheet to below the carriage, means connected to move said carriage parallel to said plane to opposite a discharge way, and means arranged to eject said package from said carriage transversely of said plane at said discharge position whereby the depending edge of the sheet at the front of the package is folded rearwardly under the package by the edge of said discharge way.

21. In a wrapping machine having means for intermittently advancing packages with a sheet of polyolefin wrapping material wrapped therearound and overhanging the ends of the package, and overhanging the bottom of the package at the front thereof, means for forming and sealing overlapped end and bottom and folds of said wrapper on said package comprising walls forming a folding way with a bottom and spaced side walls, a pusher arranged to push a package sideways between said side walls and across the leading edge of said bottom wall to form leading side end folds in the projecting ends of said wrapper and fold the leading edge of the bottom of the wrapper against the bottom of the package, upwardly inclined slots in the leading ends of said side plates positioned to receive the bottom end portions of the projecting part of said wrapper and fold them upwardly against the ends of the package, upright belt loops trained along opposite sides of said way at the outlet ends of said side walls to receive packages therefrom, freely rotatable upright rollers supporting said belt loops, said belt loops being formed of heat resistant and heat transmitting material with smooth surfaces that are relatively non-adhesive to plastic polyolefin, heater plates mounted within said belt loops and movable into and away from heat transmitting contact with said belts at the inlet ends of said loops, backing plates supporting the opposed sides of said loops behind said heater plates and being of heat conducting material to absorb and radiate heat from said belts and the packages retained therebetween, said rollers and said backing plates and said heater plates being laterally adjustable relative to said way to adjust the pressure of said belts against the end folds on said packages, and means including a shaft rotated upon each cycle of said machine and having cams thereon connected to advance and retract said heater plates and said pusher in timed relation.

22. In a wrapping machine having means for intermittently advancing packages with a sheet of polyolefin wrapping material wrapped therearound and overhanging the ends of the package and overhanging the bottom of the package at the front thereof, means for forming and sealing overlapped end folds of said wrapper on said package comprising walls forming a folding way with a bottom and spaced side walls, a pusher arranged to push a package sideways between said side walls to form leading side end folds in the projecting ends of said wrapper, upwardly inclined slots in the leading ends of said side plates positioned to receive the bottom end portions of the projecting part of said wrapper and fold them upwardly against the ends of the package, upright belt loops trained along opposite sides of said way at the outlet ends of said side walls to receive packages therefrom, freely rotatable upright rollers supporting said belt loops, said belt loops being formed of heat resistant and heat transmitting material with smooth surfaces that are relatively non-adhesive to plastic polyolefin, heater plates mounted within said belt loops and movable into and away from heat transmitting contact with said belts at the inlet ends of said loops, said plates having raised surfaces positioned to oppose the thickest portions of said end folds and recessed surfaces positioned to oppose thinner overlapped portions of the end folds, backing plates supporting the opposed sides of said loops behind said heater plates, and means including a shaft rotated upon each cycle of said machine and having cams thereon connected to advance said pusher and advance and retract said heater plates.

23. In a wrapping machine having means for intermittently advancing packages with a sheet of polyolefin wrapping material wrapped therearound and overhanging the ends of the package and overhanging the bottom of the package at the front thereof, means for forming and sealing overlapped end folds of said wrapper on said package comprising walls forming a folding way with a bottom and spaced side walls, a pusher arranged to push a package sideways between said side walls to form leading side end folds in the projecting ends of said wrapper, upwardly inclined slots in the leading ends of said side plates positioned to receive the bottom end portions of the projecting part of said wrapper and fold them upwardly against the ends of the package, upright belt loops trained along opposite sides of said way at the outlet ends of said side walls to receive packages therefrom, freely rotatable upright rollers supporting said belt loops, said belt loops being formed of heat resistant and heat transmitting material with smooth surfaces that are relatively non-adhesive to plastic polyolefin, heater plates mounted within said belt loops and movable into and away from heat transmitting contact with said belts at the inlet ends of said loops, backing plates supporting the opposed sides of said loops behind said heater plates, and means including a shaft rotated upon each cycle of said machine and having cams thereon connected to advance said pusher and advance and retract said heater plates.

24. In a wrapping machine having means for intermittently advancing packages with a sheet of polyolefin wrapping material wrapped therearound and overhanging the ends of the package, means for forming overlapped end and bottom folds of said wrapper on said package, a pusher arranged to push a package sideways between said fold forming means, upright belt loops trained along opposite sides of a way at the outlet ends of said fold forming means to receive packages therefrom, freely rotatable upright rollers supporting said belt loops, said belt loops being formed of heat resistant and heat transmitting material with surfaces that are relatively non-adhesive to plastic polyolefin, heater plates mounted within said belt loops and movable into and away from heat transmitting contact with said belts at the package inlet ends of said loops, said heater plates having recessed faces engageable with said belts with raised areas adjacent the recesses registering with the multi-thickness areas where the end folds in said wrapper sheet overlap, backing plates supporting the opposed sides of said loops beyond said heater plates and being of heat conducting material to absorb and radiate heat from said belts and the packages retained therebetween, said rollers and said backing plates and said heater plates being laterally adjustable relative to said way to adjust the pressure of said belts against the end folds on said packages, and means including a shaft rotated upon each cycle of said machine and having cams thereon connected to advance and retract said heater plates and said pusher in timed relation.

25. In a wrapping machine having means for intermittently advancing packages with a sheet of polyolefin wrapping material wrapped therearound and overhanging the ends of the package, means for forming overlapped end and bottom folds of said wrapper on said package, a pusher arranged to push a package sideways between said fold forming means, upright belt loops trained along opposite sides of a way at the outlet ends of said fold forming means to receive packages therefrom, freely rotatable upright rollers supporting said belt loops, said belt loops being formed of heat resistant and heat transmitting material with surfaces that are relatively non-adhesive to plastic polyolefin, heater plates mounted within said belt loops and movable into and away from heat transmitting contact with said belts at the package inlet ends of said loops, said heater plates having recessed faces engageable with said belts with raised areas adjacent the recesses registering with the multi-thickness areas where the end folds in said wrapper sheet overlap, backing plates supporting the opposed sides of said loops beyond said heater plates and being of heat conducting material to absorb and radiate heat from said belts and the packages retained therebetween, and means including a shaft rotated upon each cycle of said machine and having cams thereon connected to advance and retract said heater plates and said pusher in timed relation.

26. In a wrapping machine having means for intermittently advancing packages with a sheet of polyolefin wrapping material wrapped therearound and overhanging the ends of the package, means for forming overlapped end folds of said wrapper on said package, a pusher arranged to push a package sideways between said fold forming means, upright belt loops trained along opposite sides of said way at the outlet ends of said fold forming means to receive packages therefrom, freely rotatable upright rollers supporting said belt loops, said belt loops being formed of heat resistant and heat transmitting material with surfaces that are relatively non-adhesive to plastic polyolefin, heater plates mounted within said belt loops and movable into and away from heat transmitting contact with said belts at the insides of said loops, backing plates supporting the opposed sides of said loops beyond said heater plates and being of heat conducting material to absorb and radiate heat from said belts and the packages retained therebetween, and means to advance and retract said heater plates and said pusher in timed relation.

27. In a wrapping machine having means for intermittently advancing packages with a sheet of polyolefin wrapping material wrapped therearound and overhanging the ends of the package, means for forming overlapped end folds of said wrapper on said package, a pusher arranged to push a package sideways between said fold forming means, upright belt loops trained along opposite sides of said way at the outlet ends of said fold forming means to receive packages therefrom, freely rotatable upright rollers supporting said belt loops, said belt loops being formed of heat resistant and heat transmitting material with surfaces that are relatively non-adhesive to plastic polyolefin, heater plates mounted within said belt loops and movable into and away from heat transmitting contact with said belts at the insides of said loops, and means to advance and retract said heater plates and said pusher in timed relation.

28. In a wrapping machine having means for intermittently advancing packages with a sheet of polyolefin wrapping material wrapped therearound with overlapping end folds on the ends of the package, means for sealing said overlapped end folds comprising sheets of heat resistant and heat transmitting material with surfaces that are relatively non-adhesive to plastic polyolefin positioned to contact said folds at a sealing station, heater plates movable into and away from heat transmitting contact with said sheets at said sealing station, and raised areas on the opposed faces of said plates positioned to oppose the thicker overlapped portions of said end folds on said packages, with relatively recessed adjacent areas on the plates to oppose lesser thickness of the end folds.

29. In a packaging machine, a carriage transversely reciprocable between a front loading station and an unloading station, end folding plates on said carriage, means arranged to advance a sheet of limp film wrapping material to a vertical position in front of the loading station, means to move a package rearwardly to between said plates to pull said sheet into bottom, back and top folds and form rear end tucks between said end plates, spaced vertically reciprocable plates located at said unloading station, means to lower said last plates down alongside said end plates to form top end tucks in said sheet, means arranged to push said package from between said end plates and said vertically reciprocable plates at said unloading station, spaced stationary guide plates positioned to receive the package from said end plates and form front end tucks in said sheet, said guide plates having slots inclined upwardly and rearwardly relative to their receiving ends to receive and fold up bottom end folds in said sheet, and end sealing means positioned to engage the ends of the package beyond said guide plates.

30. In a packaging machine, a carriage transversely reciprocable between a front loading station and an unloading station, end folding plates on said carriage, means arranged to advance a sheet of limp film wrapping material to a vertical position in front of the loading station, means to move a package rearwardly to between said plates to pull said sheet into bottom, back and top folds and form rear end tucks between said end plates, spaced vertically reciprocable plates located at said unloading station, means to lower said last plates down alongside said end plates to form top end tucks in said sheet, means arranged to push said package from between said end plates and said vertically reciprocable plates at said unloading station, spaced stationary guide plates positioned to receive the package from said end plates and form front end tucks in said sheet, means to fold up bottom end folds in said sheet, and end sealing means positioned to engage the ends of the package beyond said last means.

References Cited in the file of this patent
UNITED STATES PATENTS

| | | |
|---|---|---|
| 2,676,445 | Kottmann | Apr. 27, 1954 |
| 2,727,345 | Schopee | Dec. 20, 1955 |